Aug. 7, 1951  S. McA. SCOTT  2,563,427
INTERCONNECTED PLURAL CONVEYER
Filed April 15, 1947  3 Sheets-Sheet 1

INVENTOR
Samuel Mcadam Scott
By Richardson, Davis and Norton his ATTYS

Aug. 7, 1951  S. McA. SCOTT  2,563,427
INTERCONNECTED PLURAL CONVEYER
Filed April 15, 1947  3 Sheets-Sheet 2
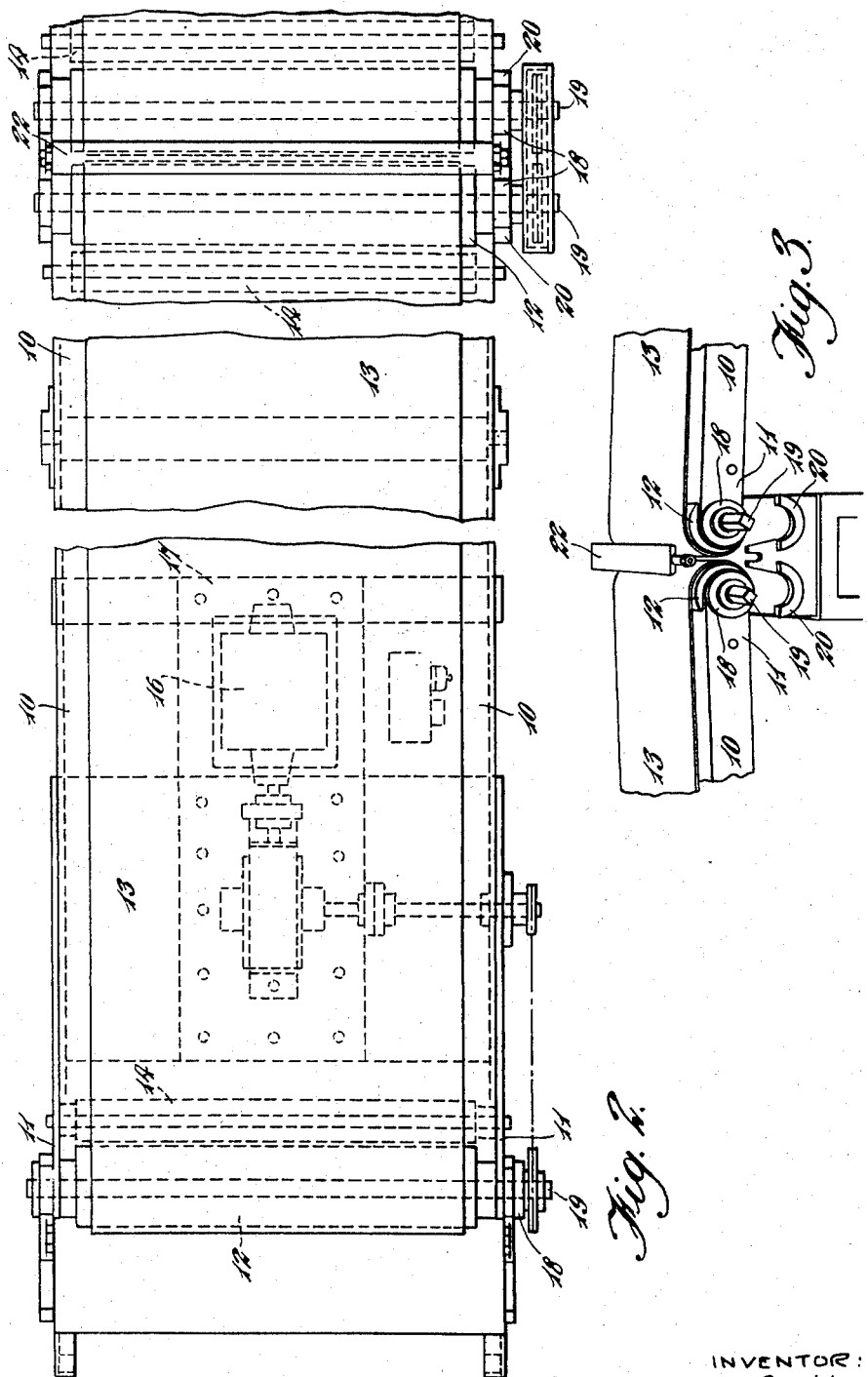
INVENTOR:
Samuel Mcadam Scott
By Richardson, David and Nordan
his ATT'YS.

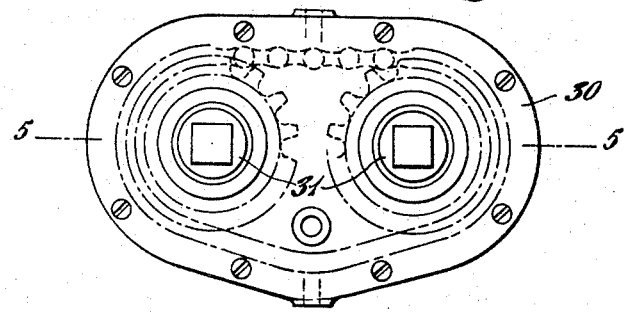
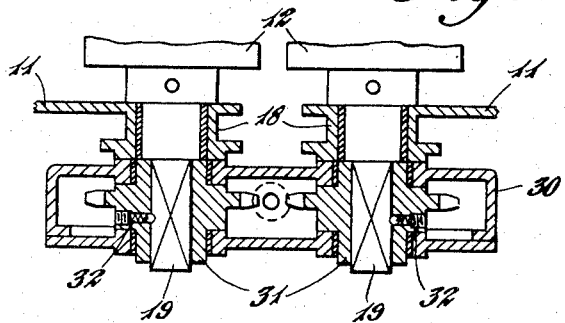
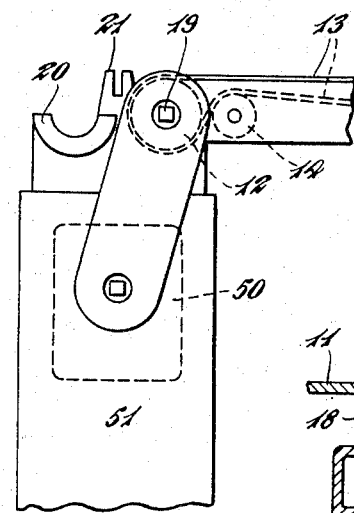
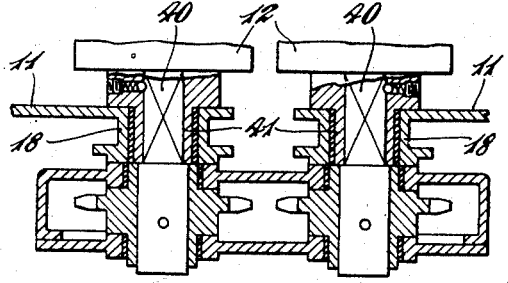

Patented Aug. 7, 1951

2,563,427

UNITED STATES PATENT OFFICE 2,563,427

INTERCONNECTED PLURAL CONVEYER

Samuel McAdam Scott, Birmingham, England, assignor to J. Collis & Sons Limited, London, England, a British company Application April 15, 1947, Serial No. 741,490
In Great Britain April 25, 1946

6 Claims. (Cl. 198—102)

This invention relates to improvements in conveyors, more particularly belt, slat and chain conveyors (hereinafter referred to generically as "belt conveyors"), and has for its chief object to provide a unit form of conveyor which lends itself readily to the production of a conveyor of any desired length by the assembly of the required number of units end to end. A further object of the present invention is to provide a novel form of coupler for coupling the units together whereby it will be unnecessary to provide separate driving means for each unit of the conveyor.

A belt conveyor according to the present invention is made up of a number of conveyor units each comprising a frame within which the conveyor belt is mounted in the usual way on, at least, end rollers, the spindles of which run in bearings on the outside of the frame, the bearings at the ends of two consecutive units being carried by cradles whereby they are spaced at a predetermined distance apart and the spindles being coupled together by means of a removable self-contained coupling unit engaging therewith.

The spindles of the end rollers may either project through the bearings at the side of the frame and be adapted to take into the rotatable elements of the coupling units or may be provided with recesses to receive projecting portions of the rotatable elements of the coupling unit.

The units of the conveyor may be driven by a power unit carried by one of the units, or alternatively, the power unit may be carried by one of the stands, slings or the like employed to support the ends of the units.

With a view to bridging the gap between the ends of the units an upward projection may be provided between the pair of cradles employed to support the ends of the units, said projection being slotted to receive a skid plate or a small roller.

In order that this invention may be the more clearly understood and readily carried into effect, reference may be made to the accompanying drawings which illustrate by way of example certain convenient embodiments of this invention and in which:

Figure 2 is a plan view of the same.

Figure 3 is a perspective view of the upper part of one of the stands showing the ends of the two units ready to be dropped into the cradle.

Figure 4 is an elevation of one form of coupler for coupling together the ends of the two units of the conveyor according to the present invention, and Figure 5 is a section on line 5—5 of Figure 4 showing the coupler in position coupling together the ends of two units of the conveyor.

Figure 6 is an elevation of a further form of unit conveyor (in part) in which the power unit, instead of being carried by a unit of the conveyor, is carried by the stand.

Figure 7 is a section similar to that shown in Figure 5 through a modified form of coupler according to the present invention.

Figure 1:
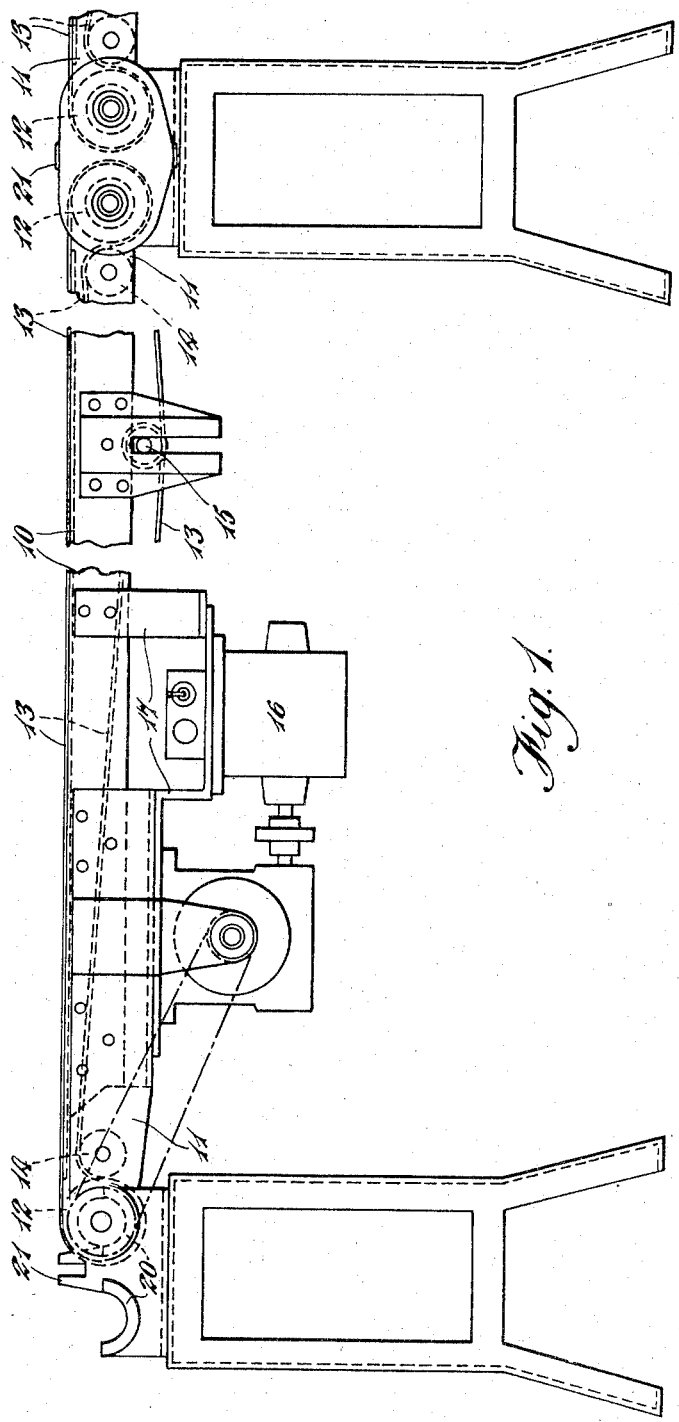
Figure 1 is an elevation of part of a unit conveyor according to the present invention.

Referring now more particularly to Figures 1 to 5 of the accompanying drawings a conveyor unit according to the present invention comprises a frame 10 of a convenient length and width formed of two side members provided at each end with extensions 11 carrying the end rollers 12 over which the belt 13 runs in the usual manner. The side members also carry snubbing rollers 14 round which the belt runs. A tension adjusting device 15 of a suitable form is conveniently provided intermediate the ends of the frame and where the unit is a driving unit, as distinct from a driven unit, a power unit, for example an electric motor 16, may be mounted on brackets 17 carried by the side members of the frame 10, this power unit being coupled to one end roller, or to both end rollers, preferably through reduction gearing.

The extensions 11 on the side members of the frame 10 are provided on their outer surfaces with projecting bearings 18 and the roller spindles 19 project beyond these bearings as shown, the projecting portion being of square or other non-circular cross section, which expression is in all cases to be taken as including round section spindles with feather keys or splines.

The conveyor may be supported on stands, slings or in any other suitable manner, but for the sake of simplicity it will be assumed that the units are to be supported on stands. In this case, each stand is provided at its upper end with a pair of spaced cradles 20 adapted to receive the outstanding bearings 18 of the roller spindles 19. The required number of stands having been placed in position the bearings 18 of the units are dropped into the cradles 20 in which they are a snug fit. The cradle member may extend upwardly at the centre between the two cradles as at 21 and may be slotted to receive a skid plate 22 or a small roller to bridge the gap between the ends of the belts of the two units. All that is now necessary to complete the conveyor is to provide means for coupling up the belts of the individual units. For this purpose a self-contained coupling unit, shown more particularly in Figures 4 and 5 of the accompanying drawings, is employed. This coupler comprises a casing 30 having two hollow shafts 31 spaced apart by a distance equal to the spacing of the spindles in the cradles 20, the hollow shafts being adapted to be pushed over the projecting ends of the roller spindles and ball or other retaining means 32 being provided, if desired, to hold the spindles within the shafts. The two hollow shafts 31 are coupled together within the casing by means of a chain, belt, friction, gear or other drive as desired and are arranged to rotate in the same direction, or, if the sections of the conveyor are to run towards one another, in opposite directions. Preferably a chain drive is employed and, in this case, it will, in general, be found sufficient to employ a coupling unit at one end only of the rollers to transmit the drive from one unit of the conveyor to the next. With a long conveyor it may be found desirable to boost up the drive and this can easily be done by inserting a driving conveyor unit, i. e. a unit provided with a power unit, at a suitable position.

The coupler casing is preferably sealed oil-tight and, as it can easily be pushed onto or pulled off the ends of the roller spindles 19, the whole conveyor may be very quickly erected and dismantled when required. The unit construction according to the present invention also has the advantage that any unit may be inclined at an angle, upwardly or downwardly as required, the unit in question being turned about its bearing in the cradle as the fulcrum. The units may also be arranged in tiers.

Instead of providing hollow shafts in the coupler and extending the spindles 19 of the end rollers 12 beyond the bearings 18, this arrangement may be reversed as shown in Figure 7. In this case the coupler is provided with projecting shafts 40 of square or other desired non-circular cross section adapted to take into corresponding recesses 41 in the spindles 19 of the end rollers 12. The same result will be obtained but by providing the male parts of the male and female connection on the coupler the danger of an exposed, rotating and projecting part, if the coupler is not in position, will be avoided.

It will be appreciated that the conveyor above described is built up from two kinds of units, one a driving unit and the other a driven unit. This is not necessary since all units can be identical and be driven units without departing from the scope of the present invention. Such an arrangement is to be preferred for many purposes and is illustrated in Figure 6 of the accompanying drawings. Here the power unit, for example an electric motor, reduction gear and the controls 59 may be housed within a stand as at 51 or may be carried by the stand in any other suitable way. Where the units are supported by slings or the like, the slings may carry the power unit.

All the units of the conveyor will now be driven units and may be identical.

The driving means may be mounted in or on the stand in any way that is found convenient and preferably terminate in a projecting or recessed spindle which is so located with respect to the cradles at the top of the stand that it may be coupled to the projecting or recessed spindle of a conveyor unit located in the cradle by means of a self-contained coupling unit the same as, or similar to, those used for coupling together the individual units of the conveyor.

According to a further feature of the present invention, the squared or other non-circular projecting ends of the spindles of the conveyor units and/or of the output shafts of the driving means carried by the stand or the like are made longer than is necessary to receive a single coupling unit, and preferably of such a length that they can receive two coupling units. This will enable the driving means to be coupled to two conveyor units, one on each side of the "powered stand" or, alternatively, will enable two conveyor units to be coupled together in the normal way over a "powered stand" whilst the drive is applied to only one of the conveyor units. The same result can be obtained by suitably modifying the couplers when they are adapted to push into the recessed ends of the spindles.

The establishment of the drive to the units by means of a push-on coupler similar to that employed for coupling the units together has the advantage that by using couplers of different ratios the speed of the conveyor may be easily changed or its direction of movement reversed.

If desired, the stands may be adjustable and mobile. They may, for example, be provided with castors and be rendered immobile by spragging.

It will be understood that references to "belts" throughout this specification and in the appended claims are intended to cover the corresponding elements i. e. slats of material attached to chains or the like, or chains, in the case of slat and chain conveyors.

I claim:

1. A belt conveyor made up of a number of conveyor units each comprising a frame, a conveyor belt mounted within said frame, end rollers, bearings on the outside of said frame, spindles for said rollers, said spindles running in said bearings, a plurality of cradles, the bearings at the ends of two consecutive units being carried by said cradles and spaced at a predetermined distance apart a removable self-contained coupling means the spindles being coupled together by said coupling means.

2. A belt conveyor according to claim 1, in which the spindles of the end rollers project beyond the bearings and in which said coupling means comprises driving elements provided with corresponding non-circular recesses, the latter being engaged by the projecting ends of said spindles.

3. A belt conveyor according to claim 1 including a power unit carried by one of the units of the conveyor.

4. A belt conveyor according to claim 1 including between each pair of cradles an upward slotted projection adapted to receive a skid plate.

5. A device according to claim 1 in which said coupling means comprise a casing, two shafts coupled together in said casing, said shafts having recesses to receive the projecting ends of the spindles of the end rollers of the conveyor units.

6. A coupler according to claim 5 provided with retaining means removably mounted on the projecting spindles of the end rollers of the coupler.

SAMUEL McADAM SCOTT.

REFERENCES CITED

The following references are of record in the file of this patent:

UNITED STATES PATENTS

| Number | Name | Date |
| --- | --- | --- |
| 1,006,790 | Reinbold | Oct. 24, 1911 |
| 1,489,752 | Fraley | Apr. 8, 1924 |
| 2,105,889 | Madeira | Jan. 18, 1938 |